*Inventors*
Charles J. Gross
Henry B. Kimball
Wilbur H. Farley
Harold W. Bishop
By their Attorney

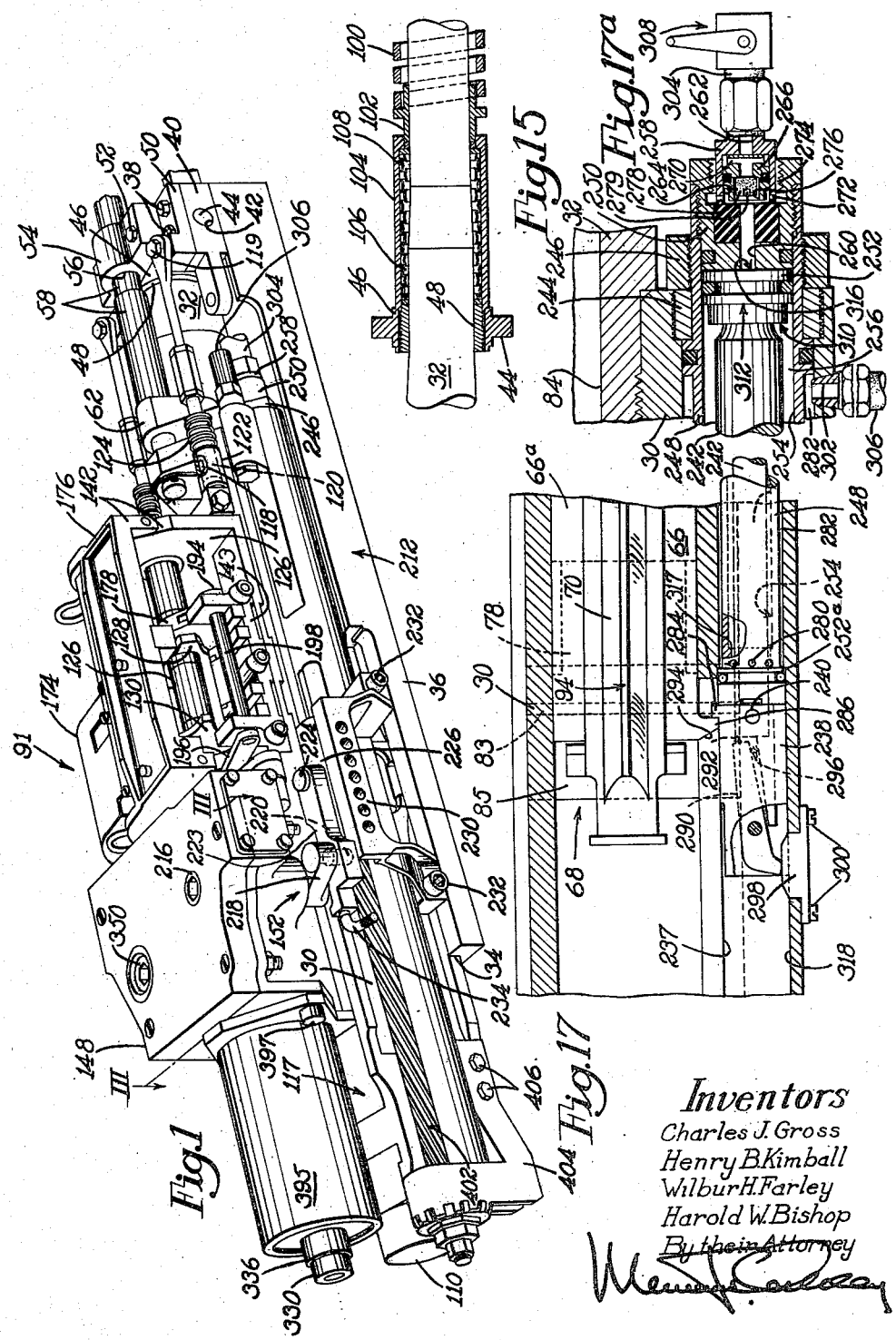

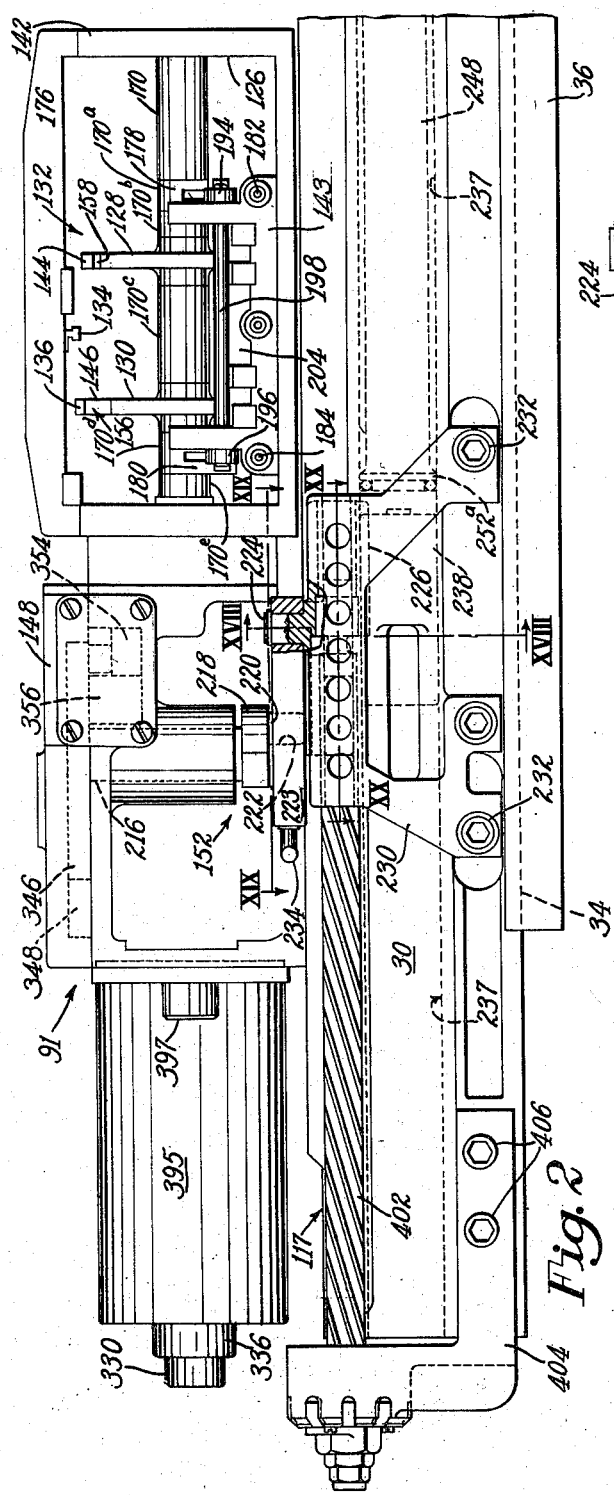
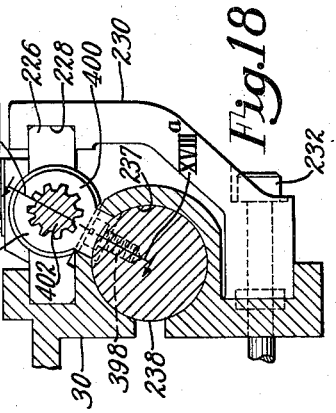
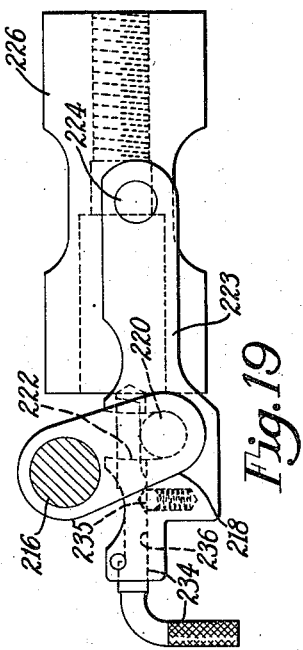
Inventors
Charles J. Gross
Henry B. Kimball
Wilbur H. Farley
Harold W. Bishop
By their Attorney

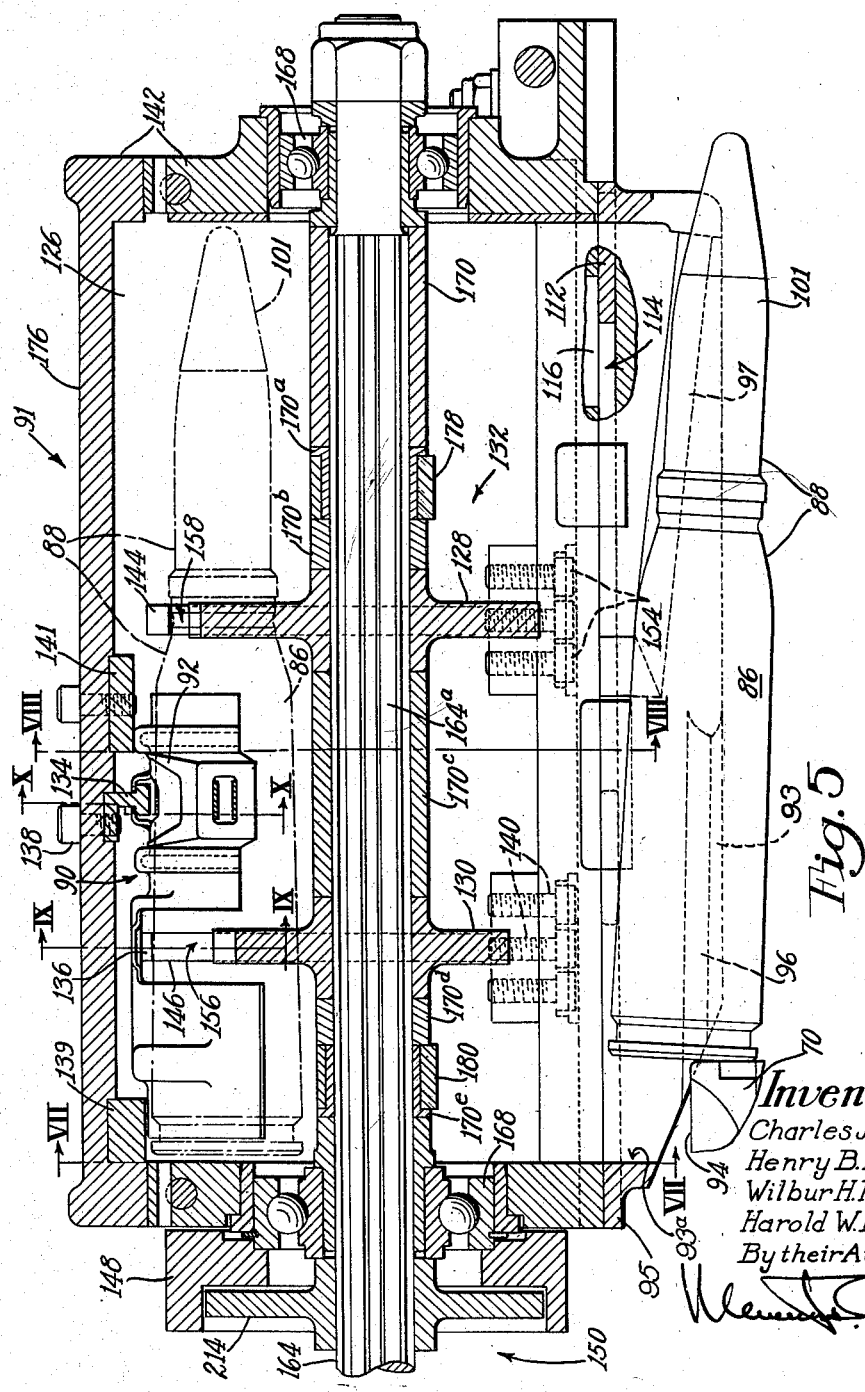

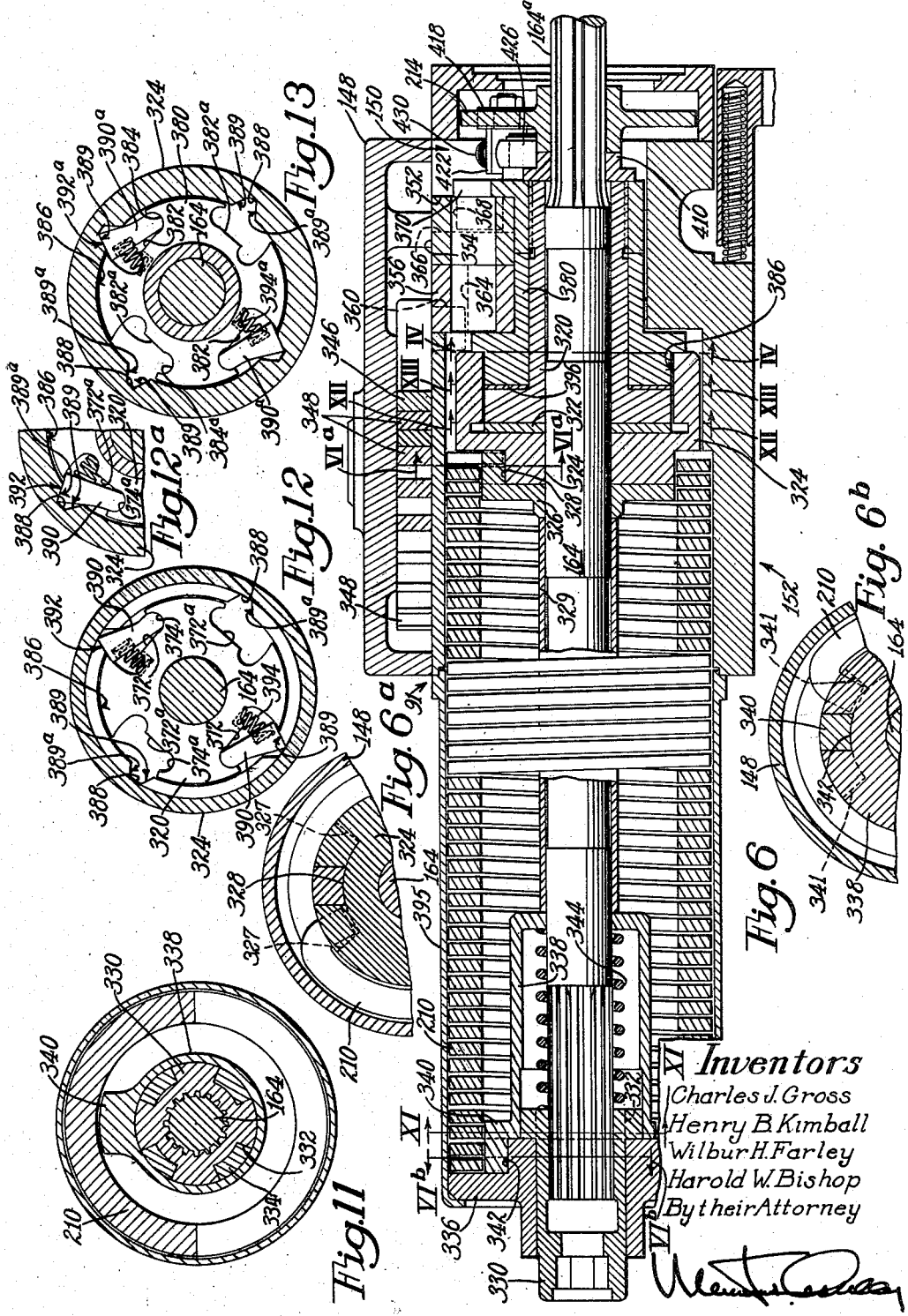

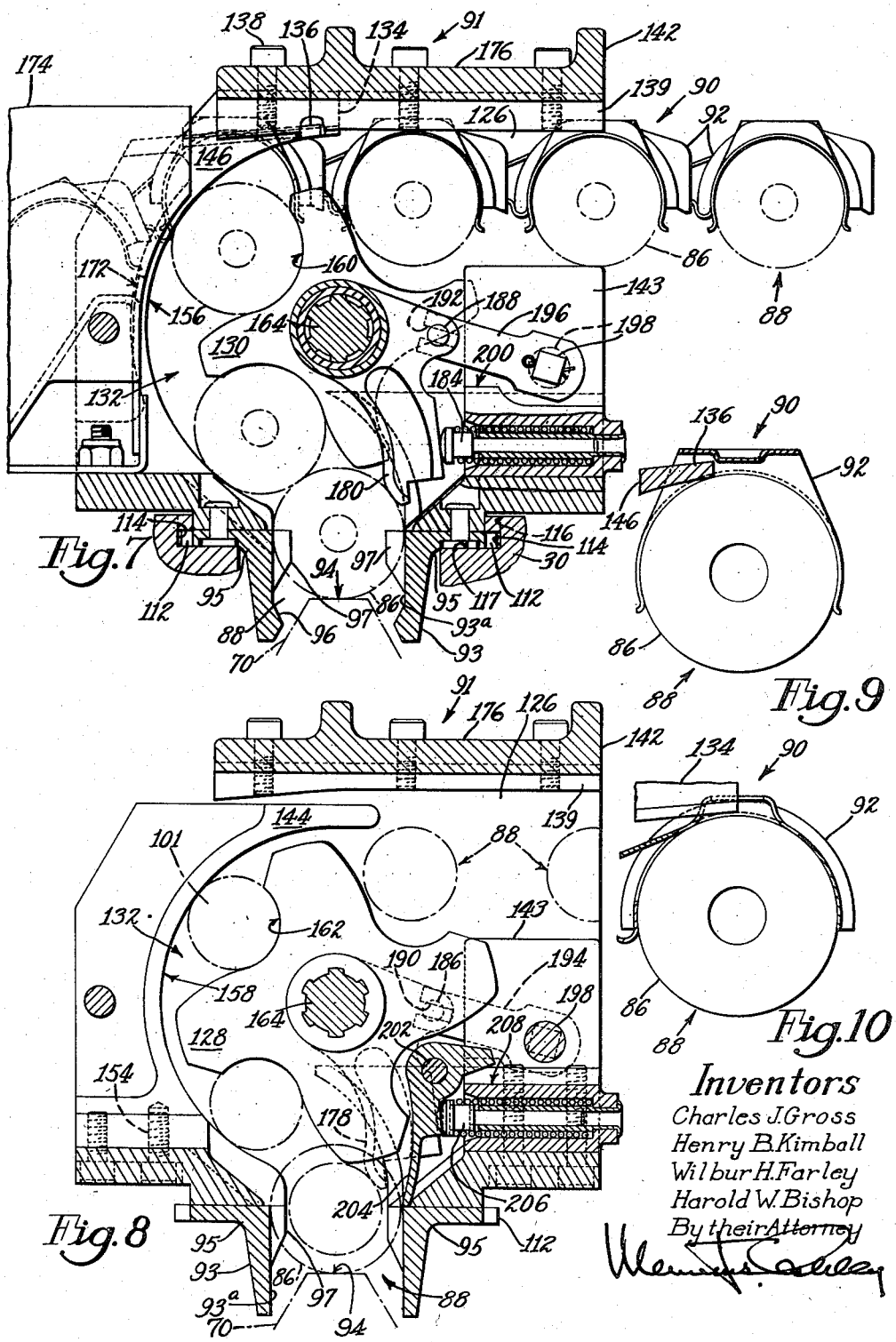

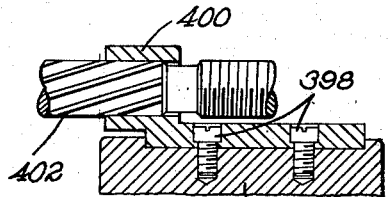
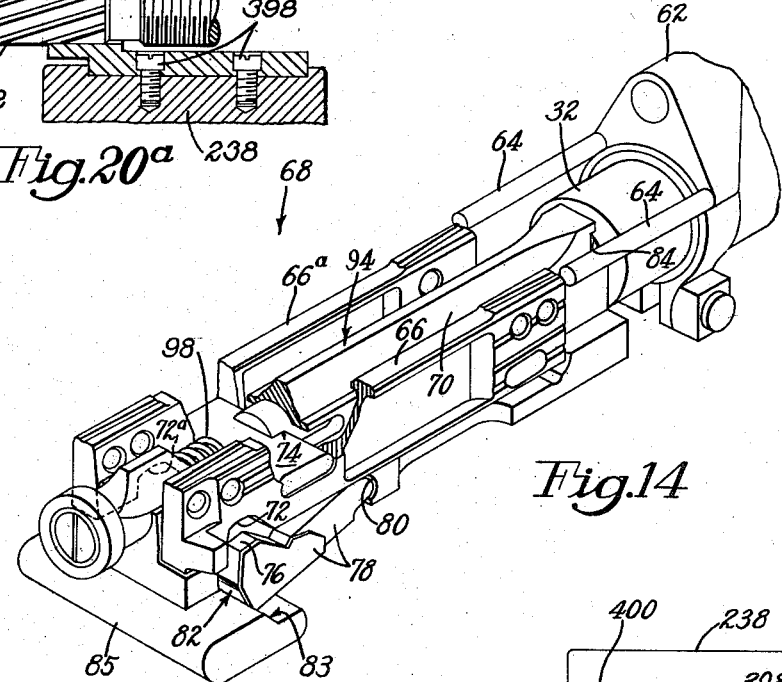
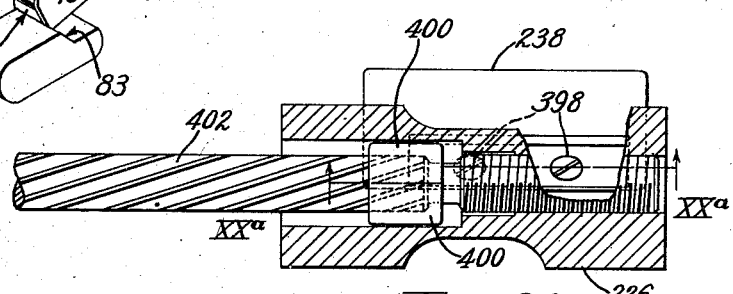
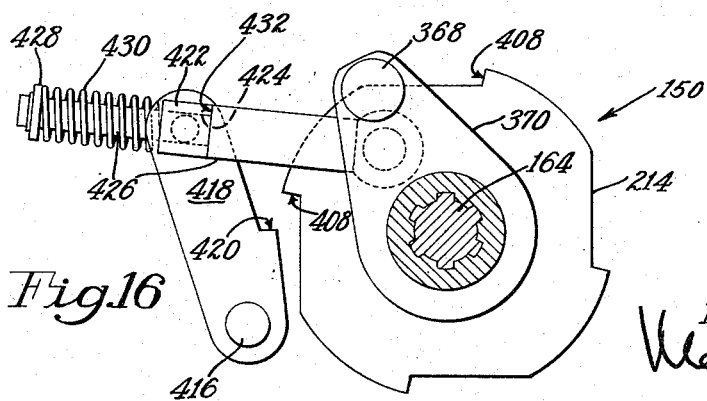

United States Patent Office 2,821,887
Patented Feb. 4, 1958

2,821,887

AUTOMATIC GUNS

Charles J. Gross, Melrose, Henry B. Kimball, Marblehead, Wilbur H. Farley, Ipswich, and Harold W. Bishop, Essex, Mass., assignors to United Shoe Machinery Corporation, Flemington, N. J., a corporation of New Jersey Application July 27, 1954, Serial No. 446,052

3 Claims. (Cl. 89—33)

This invention relates to automatic guns and is illustrated herein with reference to an improved feeder, which automatically supplies ammunition to a 20 mm. gun and is energized by recoil and counterrecoil movement of a receiver of said gun, and also with reference to a charger which not only initially loads the gun for firing, but also energizes the feeder as the gun is loaded.

The present invention consists in the novel features, hereinafter described, of the feeder and the charger and also in a novel combination of the feeder and charger and a feed interrupter, reference being had to the accompanying drawings which illustrate one embodiment of the invention selected for purposes of illustration, said invention being fully disclosed in the following description and claims.

In the drawings,

Fig. 1 is a perspective view of the illustrative gun a forward portion of which has been broken away;

Fig. 2 shows in side elevation and on an enlarged scale a rear portion of the gun illustrated in Fig. 1;

Figs. 5 and 6 are median vertical sections through the front and rear portions respectively of the ammunition feeder;

Figure 3:
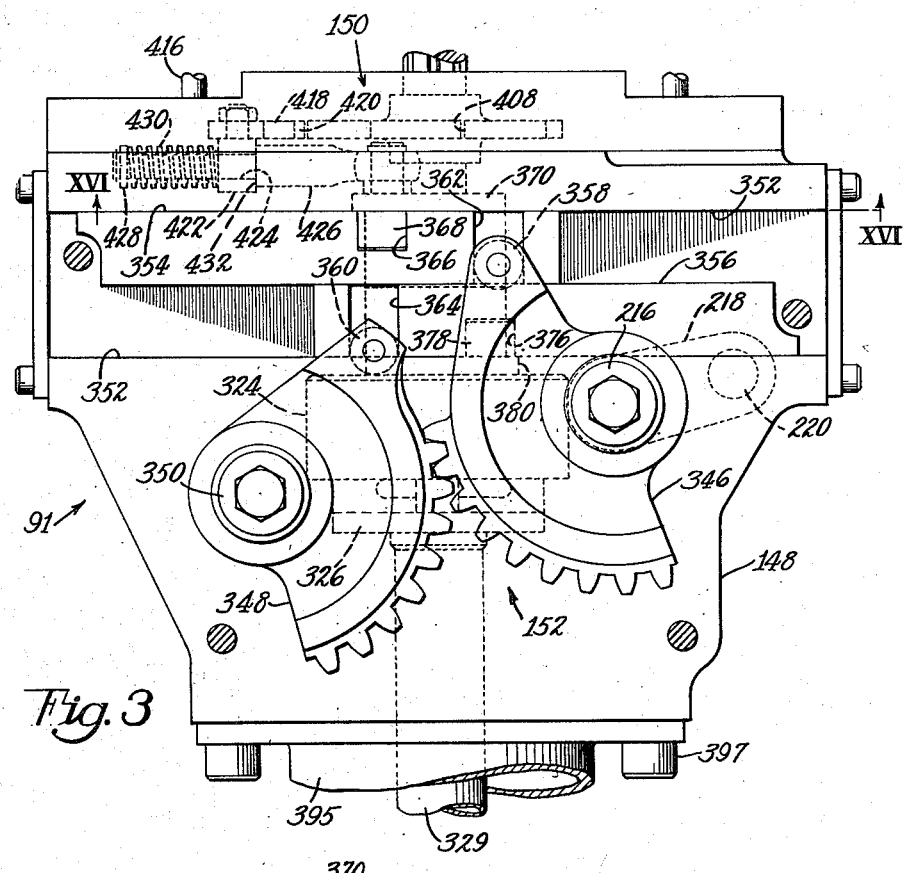
Fig. 3 is a plan view on the line III—III of Fig. 1 showing portions of an ammunition feeder of the illustrative gun.

Figs. 6ª and 6ᵇ are sections on the lines VIª—VIª and VIᵇ—VIᵇ respectively of Fig. 6;

Fig. 7 is a transverse section on the line VII—VII of Fig. 5 illustrating cartridges which are joined by links being fed into the feeder and also illustrating cartridges, which have been extracted from said links and have passed partially through the feeder, being transferred to a rest position from which they are successively chambered during movements of a bolt in counterrecoil;

Fig. 8 is a transverse section through the ammunition feeder on the line VIII—VIII of Fig. 5;

Figs. 9 and 10 are sections on the lines IX—IX and X—X of Fig. 5 showing a cartridge about to be extracted from a link, with which it has been assembled, by the use of stripper fingers forming part of said feeder;

Fig. 11 is a view on the line XI—XI of Fig. 6 showing portions of mechanism for operatively connecting a feeder torsion spring with a feeder shaft;

Fig. 12 is a section taken on the line XII—XII of Fig. 6 showing a portion of a drive by which the torsion spring is energized;

Fig. 12ª is a section on the line XIIª—XIIª of Fig. 6 showing portions of a drive movement of which is in a direction opposite to the direction of movement of the drive illustrated in Fig. 12;

Fig. 13 is a section on the line XIII—XIII of Fig. 6;

Fig. 14 shows in perspective a bolt assembly of the gun;

Fig. 15 is a horizontal median section through part of a rear barrel portion of the gun;

Fig. 16 is a section on the line XVI—XVI of Fig. 3 showing an interrupter for temporarily stopping movement of a feed wheel of the feeder of the gun;

Figs. 17 and 17ª are horizontal sections showing in detail on different scales rear and forward portions respectively of a charger of the gun;

Figs. 18, 19 and 20 are views of the charger on the lines XVIII—XVIII, XIX—XIX and XX—XX respectively of Fig 2; and Fig. 20ª is a section on the line XXª—XXª of Fig. 20.

The present invention will be described as embodied in a 20 mm. automatic gun comprising a receiver 30 and a barrel 32 which is threaded into the receiver and is slidable in recoil and counterrecoil along ways 34 (Figs. 1 and 2) formed in a cradle or base 36 which may be rigidly secured, for example, to a frame (not shown) of an airplane.

Secured to the cradle 36 at opposite sides of the gun by a pair of bolts 38 (Fig. 1) are trunnion blocks 40 and anchoring plates 50, said blocks having bores 42 for receiving trunnions 44 of a collar 46 (Figs. 1 and 15) threaded onto a bearing 48 in which the barrel 32 slides during recoil and counterrecoil of the gun. Secured by bolts 52 to the collar 46 is a bearing bracket 54 having a bore 56 for slidingly supporting a piston 58 actuated by gases bled from the barrel 32.

Carried by the piston 58 is a header 62 (Figs. 1 and 14) in which are mounted a pair of rods 64 which, during the first part of the movement of the receiver 30 and the barrel 32 in recoil, strike the forward ends of upstanding slides 66, 66ª of bolt mechanism 68 (Figs. 14 and 17) to move said slides to a rear limit of movement upon a bolt 70, thereby causing recesses 72, 72ª (Fig. 14) in the slides, which are secured together for longitudinal movement by a cross bar 74, to be arranged above upstanding projections 76 of a latch 78 having a cylindrical portion which bears in a transversly extending semi-cylindrical cavity 80 in the bolt 70. When the slides 66, 66ª have been moved to their forward positions on the bolt 70, blow-back pressure of gases in a firing chamber 84 (Figs. 14 and 17ª) of the barrel 32 against the bolt 70 causes an undercut face 82 of the latch 78 to be cammed upward out of engagement with a transverse shoulder 83 of a lock plate 85 forming part of the receiver 30, thereby releasing the bolt for movement in recoil from its battery position in the receiver, the bolt thereafter moving in recoil in the receiver to extract from said chamber 84 a case 86 of a fired cartridge 88 or, in the event of a misfire, the cartridge itself.

Belted ammunition 90 is supplied to the gun by a feeder 91, the cartridges 88 carried by links 92 which are coupled to one another by reason of their being belted to the cartridges, being successively extracted from the links by the feeder and being fed by mechanism, hereinafter described and forming part of the feeder, into the upper end of a feed throat passage 93ª formed in a depending flange 93 (Figs. 5, 7 and 8) of an angle bearing piece 95 secured to and forming part of the feeder, to a rest position onto an upper face 94 of the bolt 70 then in, or substantially in, its battery position. Formed in opposite faces of the depending flange 93 are cartridge supporting and cartridge deflecting and guiding lands 96, 97 respectively. As the bolt 70 moves in recoil, it slides from its supporting position beneath the cartridge 88 then in its rest position upon the upper face 94 of the bolt thereby allowing said cartridge to drop into a waiting position in which a case 86 of the cartridge 88 rests on the supporting lands 96 and in which a projectile 101 of the cartridge is arranged between and slightly below the lands 97. During movement of the bolt 70 in counterrecoil the forward end of the bolt engages the rear end of the cartridge which, as it slides forward, is deflected nose downward by the lands 97 in a suitable path to effect chambering of said cartridge.

As the bolt 70 arrives at its battery position the latch 78 drops against the transverse shoulder 83 of the lock plate 85 of the receiver 30 and the slides 66, 66ª, which are constantly urged to their forward positions upon the bolt by a spring 98, are moved forward by hereinafter described mechanism and said spring over the latch to lock the bolt in its battery position.

Secured to the barrel 32 is a gas cylinder bracket (not shown) through a port (not shown) in which gases are "tapped" to operate the piston 58, and bearing against the collar 46 and surrounding the barrel is a heavy coil spring 100 (Fig. 15) the rear end of which bears against an annulus 102 fitting slidingly upon said barrel. A cylindrical housing 104 which is formed integral with the collar 46, and is spaced from and surrounds the barrel 32 and a forward end portion of which rests on the annulus 102, forms with said barrel a chamber 106 in which fits a ring spring 108. When the gun is fired the receiver 30 and the barrel 32 slide together in recoil distances varying between limits of 5/8" and 1 3/16" along the ways 34 of the cradle 36 against the combined action of the coil and ring springs 100, 108 respectively which constitute means for constantly urging the receiver to a rest or battery position. As the receiver 30 moves in recoil the bolt 70, in its battery position in the receiver, is unlatched as above explained, by rearward movement of the rods 64 against the slides 66, 66ª thereby allowing blowback action of the gases in the firing chamber 84 against the bolt to cam or raise the latch 78 away from the shoulder 83 of the receiver, and the bolt to be moved in recoil against a pneumatic buffer in a housing 110 (Fig. 1).

The bearing plate 95 of the feeder 91 has a projecting lateral flange 112 (Figs. 5, 7 and 8) which fits in opposite undercut guideways 114 at the top of the receiver 30, said guideways being provided with laterally extending slots 116 so that the feeder may be lowered into the guideways of the receiver until its bearing plate engages an upper face 117 of the receiver, said feeder then being slid forward a slight distance so that, during the operation of the gun, the lateral flanges 112 of the bearing plate 95 shall underlie the undercut guideways, thus preventing the feeder 91 from being lifted off the receiver.

In order that the feeder 91 shall at all times be restrained against movement lengthwise of the gun, said feeder has pivotally connected to it coupling hooks 118 (Fig. 1) interlocking respectively with coupling hooks 120 fulcrumed on bolts 119 which are threaded into the anchoring plates 50. Preparatory to removing the feeder 91 from the receiver 30 sleeves 122, normally overlying the interlocking coupling hooks 118, 120 at opposite sides of the gun, are slid forward against the action of springs 124 respectively, the coupling hooks 120 then being swung outward from their interlocking engagement with the coupling hooks 118.

As best illustrated in Figs. 7 and 8, the belted cartridges 88, which may also be referred to as rounds, are drawn into the feeder 91 through an opening 126 by the action of front and rear sprockets 128, 130 respectively of a feed wheel 132 which, as best shown in Fig. 5, engages respectively the forward and central portions of the cases 86 of the cartridges 88. As the belted ammunition 90 moves transversely across the upper portion of the feeder 91 front and rear stripper fingers 134, 136 secured by screws 138, 140 respectively to a multipart front housing 142 of the feeder 91, engage the gaps between the cartridges and the links 92, as best shown in Figs. 9 and 10 with the result that as the links are constrained to ride over the upper faces of the stripper fingers, the cartridges 88 powered by the sprockets 128, 130 and constrained for bodily movement in a circular path by deflectors 144, 146, are moved successively to their rest positions on top of the bolt 70. The opening 126 of the feeder 91 is defined in part by guide brackets 139, 141 which are engaged by the links 92, and by a guide bracket 143 upper faces of which are engaged by the cartridges in said links.

The feeder 91 comprises the front housing 142 which includes the mechanism for stripping the cartridges 88 from the links 92, as above described, and for delivering them successively to their rest positions shown in Fig. 7 on top of the bolt 70, and a rear housing 148 which includes an interrupter 150 the purpose of which will be hereinafter explained, and feed wheel energizing mechanism 152 which is powered in response to movement of the receiver in recoil and counterrecoil. The front housing 142 of the feeder 91 also includes the deflector 146 the upper end of which is shaped and arranged to serve as and constitutes the rear stripper finger 136, and the deflector 144 which is secured to the front housing by screws 154 (Figs. 5 and 8), guide faces 156 and 158 of the deflectors 146, 144 cooperating respectively with the cylindrical faces 160, 162 of the sprockets 130, 128 to withdraw the cartridges 88 from the links 92 and to effect transfer of the withdrawn cartridges to their rest positions on top of the bolt 70.

The sprockets 128, 130 are secured to a splined portion 164ª (Figs. 5 and 6) of a drive shaft 164 which is rotatably mounted in bearings 168 supported by the front housing 142 of the feeder 91, spacer sleeves 170, 170ª, 170ᵇ, 170ᶜ, 170ᵈ and 170ᵉ which surround said splined portion of the shaft being provided to retain the sprockets against axial displacement on the shaft. The links 92 from which the cartridges 88 have been stripped ride over the stripper fingers 134, 136 and as they turn downward along a guideway 172 (Fig. 7) formed in a link chute 174 secured by screws to the front housing 142, they become uncoupled from the links immediately following and drop from said chute. The front housing 142 includes a cover 176 which may be swung to a raised position to render the inside of said housing accessible.

As the leading cartridge 88 is moved into the passage 93ª of the bearing piece 95 by oncoming cartridges fed by the sprockets 128, 130 it engages and accordingly swings counterclockwise, as viewed in Figs. 7 and 8, levers 178, 180 which are journaled upon the spacer sleeves 170ª, 170ᵉ respectively and are constantly urged clockwise by spring-pressed plungers 182 (Fig. 2), 184 (Figs. 2 and 7) slidingly mounted in the guide bracket 143 of the front housing 142. The levers 178, 180 have bifurcated portions carrying pins 186 (Fig. 8), 188 (Fig. 7) which fit in notches 190, 192 formed in arms 194, 196 secured to a shaft 198 journaled in the guide bracket 143 of the front housing 142. Clockwise movement of the levers 178, 180, as viewed in Figs. 7 and 8, is limited by the engagement of the arm 196 with a face 200 of the front housing 142.

Pivotally mounted upon a bearing pin 202 (Fig. 8), which is arranged between the levers 178, 180 and secured at its opposite ends to the guide bracket 143 of the front housing 142, is a lever 204 constantly urged clockwise as viewed in Fig. 8 by a spring-pressed plunger 206 slidingly mounted in the guide bracket 143. As the leading cartridge 80 is moved toward its rest position in which it engages the upper face 94 of the bolt 70, the lever 204 is swung counterclockwise against the action of the plunger 206 to its position shown in Fig. 8. Clockwise movement of the lever 204, as viewed in Fig. 8, under the action of the plunger 206 is limited by the engagement of a horizontal arm of the lever with a stop face 208 of the guide bracket 143.

When the bolt 70 is moved in recoil the cartridge 88, in its rest position in the passage 93ª, is forced by the levers 178, 180 and also by the lever 204 into its waiting position in which it is supported upon the lands 96 with its projectile end inclined downward slightly and arranged just below the deflecting lands 97, the construction being such that as the bolt moves in counterrecoil, it engages the rear face of the waiting cartridge, as shown in Fig. 5, and forces or drives said cartridge forward and downward into the chamber 106 of the barrel 32.

It is desirable that once the cartridge 88 has been moved to its waiting position upon the supporting lands 96 it shall be held substantially in this position irrespective of the position of the gun. Accordingly, at the time the leading cartridge 88 in the gun is in its waiting position ready to be chambered the levers 180, 204, acted upon by their associated spring-pressed plungers 184 and 206, will have been moved into positions in which they just overlie (when the gun is right side up) the cartridge in its waiting position, and will prevent said cartridge from moving substantially toward the feeder and out of said waiting position.

Energy for operating the feed wheel 132 is supplied by a torsion spring or energizing member 210 (Figs. 6, 6a, 6b and 11), the driving torque of which, during the operation of the gun, is approximately constant, said spring being energized by mechanism which is hereinafter described and is actuated in response to movement of the receiver 30 in recoil and counterrecoil.

In order to chamber the first cartridge 88 in the chamber 84 of the gun and in order to extract "dud" cartridges from the chamber the illustrative gun comprises a charger 212 (Fig. 1) which is operated through its cycle by fluid pressure, for example, compressed air, and which in addition to operating upon the bolt 70 to move said bolt through its cycle in the receiver 30 energizes the torsion spring 210 by the same amount which said spring would have been energized had the gun been operating through its firing cycle.

It is desirable to reduce to a minimum the pressure as well as the amount of compressed air required for the operation of the charger 212. Accordingly, friction losses in the gun may be reduced by locking the wheel 132 against feeding movement during an early stage in the cycle of the gun thereby insuring that as the bolt 70 moves in counterrecoil the cartridge following the cartridge which is being chambered by the bolt shall not be forced by feeder action against the upper face 94 of said bolt. With the foregoing considerations in view the drive shaft 164 has secured to it just rearward of the front housing 142 a disk 214 (Figs. 5, 6 and 16) which forms part of the above-mentioned interrupter and which cooperates with mechanism hereinafter described, temporarily to arrest feeding movement of the drive shaft during all except the last portion of the movement of the bolt in counterrecoil.

Energy imparted to the feed wheel 132 by the torsion spring 210 is restored to said spring by mechanism which will now be described and is movable in response to movements of the receiver in recoil and in counterrecoil, said movements as above stated, varying between limits of 5/8" and 13/16", and averaging about 3/4". Journaled in the rear housing 148 of the feeder 91 is a vertical bearing pin 216 (Figs. 1, 2, 3 and 19) to the lower end of which is pinned an arm 218 carrying a stud 220 normally fitting in a notch 222 formed in a coupling 223 pivoted on a shoulder screw 224 threaded into an actuator slide or slide plate 226. The slide plate 226 fits in a guideway 228 (Fig. 18) formed in a side of the receiver 30 and in a bracket 230 which is secured to a side of the receiver by screws 232 and forms in effect part of the receiver. The coupling 223 is normally operatively connected to the stud 220 of the arm 218 by a lock pin 234 held by a detent 235 (Fig. 19) in a bore 236 of the coupling 223, which lock pin may be withdrawn to permit the coupling to be swung away from the receiver and accordingly away from the stud to disconnect the coupling from said arm.

Formed in the receiver 30 is a longitudinal bore 237 in which fits slidably a ram head 238 pivotally connected by a pin 240 (Fig. 17) to the rear end of a plunger 242 which is normally held in its forward position shown in Figs. 17 and 17a in the receiver 30 and which, during the firing cycle of the gun, moves with the receiver as a unit in recoil and counterrecoil. The ram head 238 may be considered part of the plunger 242. A sleeve 248 is secured in the forward portion of the longitudinal bore 237 by a nut 244 threaded into the receiver 30 and by a nut 246 threaded onto the sleeve, and into the forward end of said sleeve is threaded a header 250. The sleeve 248 slidingly receives the plunger, heads 252, 252a of said plunger being adapted to slide along an internal cylindrical surface 254 of the sleeve 248 and a shank portion of the plunger forming with the sleeve a chamber 256.

The header 250 has threaded into it a nipple 258 (Fig. 17a) said header and said nipple being provided with passages 260, 262 which are spaced by a cylindrical pocket 264 formed in the rear end of the nipple. Slidingly movable in the pocket 264 of the nipple 258 is a shuttle or shoulder valve 266 which has a plurality of radial ports 270. The nipple 258 has formed in it circumferentially spaced redially extending ports 272 which open into longitudinal vents 274 formed between the header 250 and the nipple 258 and leading to the atmosphere. Formed in the rear end of the shuttle 266 is a cylindrical recess 276 having slidable in it a cubical nylon valve 278 which has formed in its forward end a pair of cross slots 279. The sleeve 248 has extending through it at its rear end radially extending openings 280 which connect a chamber 282 formed between the sleeve and the bore 237 of the receiver 30 to the chamber 256.

The ram head 238 has an inwardly extending flange 284 (Fig. 17) which when the bolt 70 is in battery position lies in front of and is substantially engaged by a lateral flange 286 of the slide 66 which forms part of the bolt 70 and is secured to the slide 66a by the cross bar 74. Pivotally mounted upon the ram head 238 is a latch 290 which is constantly urged counterclockwise as viewed in Fig. 17 by a spring 296 and which, when the bolt 70 is in battery position, is in the position shown in Fig. 17, the latch at such time having its leading face 292 swung from a position behind a diagonal shoulder 294 of the flange 286 by reason of the engagement of a toe of the latch with a cam 298 secured by screws 300 to the receiver 30.

Compressed air from a common source (not shown) is supplied to the passage 262 of the nipple 258 and to a passage 302 leading to the chamber 282 from lines 304, 306 respectively and is available at all times for the passage 302 but is available for the passage 262 only when a charger valve 308 is open. During the normal operation of the gun (the valve 308 then being closed) air which is under pressure acts against ring-shaped faces 310, 312 of the plunger 242 and serves to maintain said plunger at the forward end of the chamber 256 and in engagement with the header 250. So long as the valve 308 is closed (the passage 260 at such time being open to the vents 274) the plunger 242 during the firing cycle of the gun moves as a unit in recoil and counterrecoil with the receiver 30. If, however, the valve 308 is opened air under pressure acting against the shuttle 266 causes said shuttle to slide rearward in the pocket 264 of the nipple 258 thus allowing air passing through the ports 270 to act against the front end of the cubical nylon valve 278 to slide said valve rearward of the recess 276 and to flow along the sides of the valve and, after the valve has reached the rearward limit of its movement, through the cross slots 279 in the valve and through the passage 260 so as to act against a front circular face 316 of the plunger 242 which face is of substantially greater area than the combined ring-shaped faces 310, 312 of the plunger, thereby moving the plunger rearward with relation to the receiver 30.

As the ram head 238 moves rearward it moves rearward with it the bolt slide 66 and accordingly the slide 66a relatively to the bolt 70 and causes through mechanism above described, the bolt to be released from its battery position, continued rearward movement of the ram head being effective to move the bolt in recoil. When the ring-shaped surface 312 of the plunger 242 engages a shoulder 317 of the sleeve 248 the bolt 70 comes to rest in its recoil position. During rearward movement of the plunger 242 and accordingly the ram head 248 the toe of the latch 290 acted upon by the spring 296 rides off the cam 298 and onto a track 318 of the receiver 30 thereby causing the face 292 of the latch 290 to assume a position behind the shoulder 294 of the associated bolt slide 66.

After the plunger 242 has moved to its rear position in the sleeve 248 the gunner closes the valve 308 with the result that high pressure air is cut off from the passage 260 and after operating against the ring-shaped faces 310, 312 of the plunger 242 returns said plunger to its rest or normal position shown in Fig. 17ª, air in front of the plunger moving the valve 278 and the shuttle 266 back to their positions shown in Fig. 17ª and thereafter escaping through the ports 272 and the vents 274 to the atmosphere. As the ram head 238 moves forward after the closing of the valve 308 the face 292 of the latch 290 acts upon the shoulder 294 of the slide 66 to move the bolt 70 forward in the receiver 30 and when said bolt reaches its battery position the latch moves the slides 66 and 66ª forward relatively to the bolt 70 thereby locking said bolt in battery position.

The drive shaft 164 comprises cylindrical portions upon which are mounted for rotation a pawl carrier 320 (Figs. 6, 12, 12ª), a spacer disk 322, a winding drum 324, a coupling cap 326 a flange of which extends into a recess 328 (Figs. 6 and 6ª) of the winding drum and forms therewith slots 327 either one of which is adapted to receive a front end portion of the spring 210, and a spacer 329. Secured to a splined rear end portion of the drive shaft 164 is a coupling thimble 330 provided with notches 332 (Figs. 6 and 11) in which normally fit circumferentially spaced longitudinal projections 334 (Fig. 11) of an end cover 336 mounted upon the thimble. Mounted upon one of the cylindrical portions of the drive shaft 164 and on the thimble 330 is a coupling cap 338 having a lateral projection 340 fitting in a recess 342 (Fig. 6) of the end cover, said lateral projection of the cap forming with the end cover slots 341 (Fig. 6ᵇ) for receiving the rear end portion of the torsion spring 210.

The torsion spring 210 which, by means hereinafter described, is loaded by rotating it about the axis of the drive shaft 164, effects rotation of the shaft and accordingly rotation of the feed wheel 132. In order to unload the spring 210 the coupling thimble 330 may be quickly disconnected from driving relation with the end cover 336 by sliding the thimble to the right, as viewed in Fig. 6, along the splined portion of the drive shaft 164 against the action of a spring 344, which is housed in a chamber of the coupling cap 338 and surrounds the drive shaft, until notches 332 of the thimble 330 are moved to the right (Fig. 6) of the projections 334 of the end cover 336.

It will be apparent that there is a direct drive between the torsion spring 210 and the feed wheel 132 and that after said spring has been initially loaded by mechanism which will be hereinafter described said wheel is continuously urged counterclockwise, as viewed in Figs. 7 and 8, and that except when temporarily stopped by the interrupter 150, when the feeder 91 has an interrupter associated with it, the spring will continuously urge cartridges 88 assembled in the links 92 into the feeder 91 and will cooperate with the stripper fingers 134, 136 to extract cartridges from the links and will successively advance the extracted cartridges to their rest positions in the passage 93ª in which positions the cartridges are in engagement with the upper face of the bolt 70.

Figure 4:
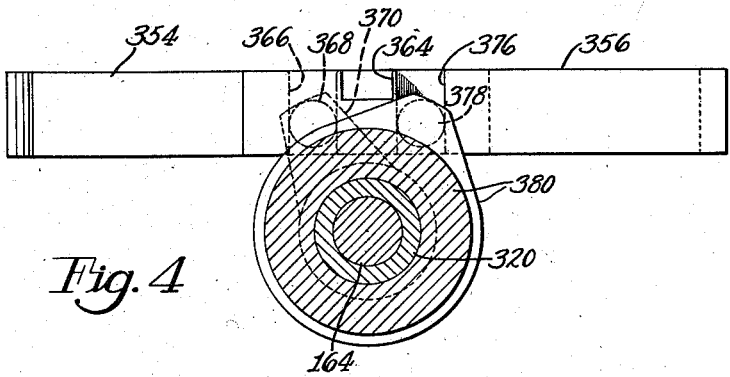
Fig. 4 is a section on the line IV—IV of Fig. 6.

Keyed to the upper portion of the shaft 216 is a gear segment 346 (Figs. 3 and 6) which meshes with a gear segment 348 secured to a shaft 350 journaled in the rear housing 148 of the feeder 91. Movable transversely along a guideway 352 formed in the rear housing 148 of the feeder 91 are front and rear slides 354, 356 movable equal distances in opposite directions by rolls 358, 360 which are carried by the gear segments 346, 348 respectively and fit in recesses 362, 364 formed in the slides. The front slide 354 has formed in its front face a recess 366 for receiving a stud 368 carried by a crank 370 keyed to the pawl carrier 320 which has formed in a peripheral face thereof pairs of opposed sockets 372 (Fig. 12), 372ª (Figs. 12 and 12ª) provided with cylindrical faces 374, 374ª respectively. The rear slide 356 has formed in its rear face a recess 376 (Figs. 3 and 4) in which fits a stud 378 carried by a pawl carrier 380 which oscillates upon the pawl carrier 320 and has formed in a peripheral face thereof, pairs of opposed sockets 382, 382ª (Fig. 13) having cylindrical bearing faces 384, 384ª respectively.

The forward end of the torsion spring 210, as above explained, is secured to the winding drum 324 which has an internal cylindrical face 386 (Figs. 6, 12, 12ª and 13) interrupted by axially extending V-shaped notches 388 which are spaced equally from one another circumferentially and have opposed abutment faces 389, 389ª. Fulcrumed in the pairs of sockets 372, 382 of the pawl carriers 320, 380 respectively are pawls 390, 390ª having cylindrical portions in engagement with the bearing faces 374, 384 of the recesses 372, 382 and having end faces 392, 392ª respectively adapted to bear in a sequence against faces 389 of the notches 388 of the winding drum 324. The pawls 390, 390ª are constantly urged outward, that is, away from the axis of rotation of the shaft 164 by springs 394, 394ª. Portions of the pawl carriers 320, 380 are spaced axially from each other by a spacer disk 396. The torsion spring 210 is enclosed by a cylinder 395 which may be considered a part of the rear housing 148 of the feeder and is secured to the main portion of said housing by screws 397.

When the receiver 30 of the gun moves in recoil, the gear segments 346, 348 are moved clockwise and counterclockwise respectively, as viewed in Fig. 3, causing the front and rear slides 354, 356 to move to the right and to the left respectively. Such motion causes the pawl carriers 380, 320 to move counterclockwise and clockwise respectively, as viewed in Figs. 13 and 12 with the result that the winding drum 324 is driven counterclockwise by the pawls 390ª with the pawl carrier 380, and the pawl carrier 320 rotates clockwise relatively to the drum and at the same angular speed as said drum. The extent of movement of the receiver 30 in recoil and counterrecoil during the firing cycle of the gun varies but the construction and arrangement of the driving connections between the slides 356, 354 and the gear segments 346, 348 respectively is such that after said slides have moved laterally along the guideway 352 distances corresponding to 45° of motion of the pawl carriers 380, 320 respectively, the studs 368, 378 leave associated recesses 366, 376, the slides thereafter traveling or riding over associated studs different distances depending upon variations in the amount of movement of the receiver in recoil.

It will be noted that the pawls 390 mounted in the carrier 320 during movement of the receiver in recoil are cammed out of the notches 388 in which they engage and move clockwise 45°, as viewed in Fig. 12. During this same period the pawl carrier 380, which is acted upon by the pawls 390ª, moves counterclockwise 45° and accordingly moves the winding drum 324 45° counterclockwise, with the result that during said recoil movement of the receiver the pawls 390 move back into adjacent slots 388. As the receiver 30 moves in counterrecoil the pawl carrier 320 moves counterclockwise 45° (Fig. 12) driving with it the winding drum 324, and the pawl carrier 380 moves clockwise 45° (Fig. 13) causing the pawls 390ª to be cammed out of the notches 388 in which they engage and to move clockwise 45° with the result that each of the pawls 390ª falls back into the next notch with its end face 392ª in engagement with one of the shoulders 389 ready to start the cycle anew when the gun is again fired. By providing the above described construction it will be apparent that the torsion spring 210 is wound and accordingly energized the same amount during recoil and counterrecoil of the receiver 30, irrespective of the amount of movement of the receiver in recoil and counterrecoil.

It is desirable to provide for feeding ammunition from the left side of the gun instead of from the right side of the gun, as illustrated in Figs. 7 and 8. Accordingly the various parts of the feeder 91 may be secured in reversed positions in the front housing 142 of the feeder. In effecting this change it is necessary to replace the torsion spring 210 by a spring wound in the reverse direction, transfer the pawls 390 to the sockets 372a and transfer the pawls 390a to the sockets 382a. In changing from right to left feed the forward and rear ends of the torsion spring 210 are preferably inserted respectively in slots 327 and 341 opposite those in which the ends of the spring are shown in Figs. 6a and 6b.

The ram head 238 has secured to it by screws 398 (Figs. 18, 20 and 20a) a nut 400 having an internal spiral thread which meshes with an elongated spiral gear 402 the rear end portion of which is rotatably mounted in a bracket 404 secured by screws 406 to the receiver 30 and a threaded forward end or extension portion of which is threaded into the slide plate 226. As already explained, during normal operation of the gun the ram head 238 is retained in position shown in Fig. 17 in the receiver by fluid pressure applied against the ring-shaped faces 310, 312 of the plunger and accordingly the slide plate 226 does not move in its guideway 228 but moves in recoil and counterrecoil as a unit together with the receiver, the torsion spring 210 being energized a constant amount during recoil and counterrecoil movements of the receiver irrespective of the extent of said movements.

When the charger 212 is operated by opening the valve 308 the plunger 242 and accordingly the ram head 238 moves rearward in the longitudinal bore 237 of the receiver 30 and the nut 400 which moves rearward with the ram head causes the spiral gear 402 to rotate and thus causes the slide plate 226 to be moved rearward along the guideway 228 in the receiver until the ring-shaped surface 310 of the plunger 242 engages the shoulder 317 of the sleeve 248. As the slide plate 226 is moved rearward in its guideway 228 the gear segments 346, 348 are swung clockwise and counterclockwise respectively, as shown in Fig. 3, to wind, through mechanism above described, the torsion spring 45°. The ram head 238 during its rearward movement moves, through mechanism above described, the bolt 70 in recoil in the receiver 30, said bolt coming to rest in its recoil position upon termination of the rearward movement of the plunger 242 which is connected by the pin 240 to the ram head. When the ram head 238 comes to rest at the end of its rearward movement in the bore 238 the gunner closes the valve 308 thereby rendering the front face 316 of the piston 242 open to atmospheric pressure with the result that the ram head 238 is moved forward by air pressure which is at all times applied against the ring-shaped faces 310, 312 of the plunger 242. During forward movement of the plunger 242 the bolt 70 is moved to its locked battery position and the slide plate 226 is moved back to its rest position in the guideway 228, the segment gears 346, 348 during said forward movement of the slide plate, being moved counterclockwise and clockwise respectively, as viewed in Fig. 3, so as to energize the torsion spring 210 the same amount that it is energized during counterrecoil movement of the receiver 30 in the ways 34 during the normal firing cycle of the gun.

It is the purpose of the interrupter 150 temporarily to stop counterclockwise movement, as viewed in Figs. 7 and 8, of the feed wheel 132 in order that cartridges following respectively the cartridges being chambered shall not be forced under substantial pressure against the upper face 94 of the bolt during most of the movement of said bolt in counterrecoil. By reducing to a minimum, during movement of the bolt 70 in counterrecoil, friction between the bolt and the cartridge about to be moved to its rest position shown in Fig. 7, the power necessary to operate the charger 212 may be kept within the limits available in airplanes.

The interrupter 150 comprises the disk 214, which is splined to the drive shaft 164 and is provided with radial shoulders 408 spaced 90° apart, and the crank 370 which is moved in timed relation with the gear segments 346, 348 and accordingly in timed relation with the receiver 30 during its movement in recoil and counterrecoil. Pivotally mounted upon a bearing pin 416 secured to the rear housing 148 of the feeder 91 is a latch 418 which is provided with a shoulder 420 and has pivotally mounted on it a block 422 having a bore 424. Mounted slidingly in the bore 424 of the block 422 is a shank portion of a connecting rod 426 which has an inner end thereof pivotally connected to the crank 370 and which has secured to its outer end a collar 428, a spring 430 being interposed between the block and the collar and serving to urge a ledge 432 of the connecting rod against the block.

During the first part of the recoil movement of the receiver 30 the disk 214 of the interrupter 150 remains substantially stationary by reason of the fact that the cartridge 88 in its rest position shown in Fig. 7 is in engagement with the upper face 94 of the bolt 70, and this prevents the feed wheel 132 from being moved counterclockwise. The crank 370, during the first part of the movement of the receiver 30 in recoil, is swung clockwise, as viewed in Fig. 16, causing the latch 418 to be moved against the disk 214 with its shoulder 420 arranged just beneath one of the shoulders 408 of the disk. As soon as the bolt 70 has moved from beneath the leading cartridge 88 in its rest position shown in Fig. 7 the feed wheel 132 in response to the action of the torsion spring 210 moves counterclockwise for a distance sufficient to close up the gap between the shoulder 420 of the latch 418 and the shoulder 408 of the disk 214, said disk coming to rest upon engagement of said shoulders. As the crank 370, after the latch 418 has engaged the disk 214, continues to be moved clockwise, as viewed in Fig. 16, during recoil movement of the receiver, it moves with it the rod 426 and compresses the spring 430.

During counterrecoil movement of the receiver 30 and in response to movement of said slide 354 to the left, as viewed in Fig. 3, the crank arm 370 moves counterclockwise, as viewed in Fig. 16, and after the shoulder 432 of the connecting rod 426 has engaged the block 422 the latch 418 is swung counterclockwise about its bearing pin 416 causing the shoulder 420 of the latch to be moved from beneath the opposed shoulder 408 of the disk, thus permitting the feed wheel 132 to be moved counterclockwise, as viewed in Fig. 7, to move the cartridge following the cartridge which is being chambered to its rest position. The timing of the latch 418 is such that the disk 214 is released only a short time before the receiver has been moved to the said limit of its stroke, such time, however, being ample to permit the round to be moved to its rest position upon the upper face of the bolt in battery position. The disk 214 and the latch 418 may be referred to as abutment members operatively connected relatively to the feed wheel 132 and to the spring winding machanism.

Since the interrupter reduces friction between the moving parts of the gun the power required to operate the charger is minimized, the cyclic rate of the gun may be increased, and the timing of the moving parts of the gun may be improved by its use.

Having thus described our invention, what we claim as new and desire to secure by Letters Patent of the United States is:

1. In an automatic gun, a cradle, a receiver movable in recoil and counterrecoil in said cradle during a firing cycle of the gun, a bolt movable in recoil and counterrecoil with the receiver and movable in recoil and counterrecoil in the receiver during said firing cycle, an actuator slide which is carried by and is movable as a unit with the receiver during the firing cycle and which is movable in the receiver when the receiver is stationary, a charger comprising a plunger which is operatively connected to the slide and is movable in opposite directions in the receiver for moving the bolt in recoil and counterrecoil in the receiver when said receiver is stationary and also for moving the actuator slide in the receiver, and an ammunition feeder which is mounted on the cradle and comprises a torsion spring, a rotatable feed wheel positively connected to one end of said spring, and mechanism operatively connected to the other end of said spring and to the actuator slide for energizing the spring in response to movement of the actuator slide as it moves with the receiver during the firing cycle or as it moves in the receiver, said charger comprising fluid pressure means operative against the plunger for holding the actuator slide against movement in a rest position in the receiver to cause during the firing cycle of the gun the actuator slide to be moved as a unit with the receiver as said receiver is moved in recoil and counterrecoil thereby energizing said spring, said fluid pressure means also being adapted to move the plunger in said opposite directions in said receiver, when the receiver is stationary, thereby effecting movement of the bolt in recoil and counterrecoil in the receiver and also effecting movement of the actuator slide in the receiver to energize said spring.

2. In an automatic gun, a fixed cradle, a receiver movable in recoil and counterrecoil in said cradle during a firing cycle of the gun, resilient means for urging the receiver to a rest position on the cradle, a bolt movable in recoil and counterrecoil in the receiver during said firing cycle, an actuator slide carried by and mounted for movement in the receiver, means for securing, during the firing cycle of the gun, the actuator slide against movement to the receiver to cause, during said cycle, the actuator slide to move as a unit with the receiver, an ammunition feeder which is fixed to the cradle and comprises a torsion spring, a feed wheel which is positively connected to one end of the spring and is rotated in one direction by said spring, and mechanism operatively connected to the other end of the spring and movable in response to movements of the actuator slide while said slide is secured by said second-named means to the receiver for energizing the spring during movements of the receiver in recoil and counterrecoil as the gun operates through its firing cycle, a charger comprising a plunger movable when said receiver is in its rest position through a cycle in the receiver to move the bolt in recoil and counterrecoil in the receiver, and means operatively connected to the plunger for moving the actuator slide in the receiver in timed relation with the bolt and for causing said mechanism to energize said spring during movement of the bolt in recoil and counterrecoil in the receiver as the gun is being charged.

3. In an automatic gun, a receiver movable in recoil and counterrecoil from and toward a battery position during a firing cycle of the gun, a bolt movable in recoil and counterrecoil together with and with relation to the receiver during said firing cycle, an actuator slide carried by and mounted for movement in the receiver, a plunger which is carried by and is movable in opposite directions in the receiver and which is operatively connected to the bolt, a gear rotatably mounted on the receiver and having an extension threaded into the actuator slide, a nut secured to the plunger and in meshing engagement with the spiral gear, an ammunition feeder comprising a torsion spring, a feed wheel operatively connected to one end of the spring, mechanism operatively connecting the actuator slide with the other end of the spring, and fluid pressure actuated means for causing said plunger and accordingly the actuator slide to be constrained for movement as a unit with the receiver during the firing cycle of the gun thereby moving said mechanism together with the receiver to cause the spring to be energized during both recoil and counterrecoil of the receiver, said fluid pressure actuated means being operative to move, when the receiver is in its battery position, the plunger in opposite directions in the receiver to operate the bolt through its cycle and also to operate the spiral gear, the nut and the actuator slide relatively to the receiver whereby to operate said mechanism and thus causing the spring to be energized.

References Cited in the file of this patent

UNITED STATES PATENTS

| | | |
|---|---|---|
| 2,377,828 | Trotter | June 5, 1945 |
| 2,436,370 | Alexander | Feb. 24, 1948 |
| 2,454,251 | Hamilton | Nov. 16, 1948 |
| 2,766,663 | Dixon | Oct. 16, 1956 |

FOREIGN PATENTS

| | | |
|---|---|---|
| 323,401 | Germany | July 24, 1920 |